Nov. 14, 1967     K. W. CLARKE     3,352,136
METAL FORMING MACHINE
Filed March 22, 1965     6 Sheets-Sheet 1
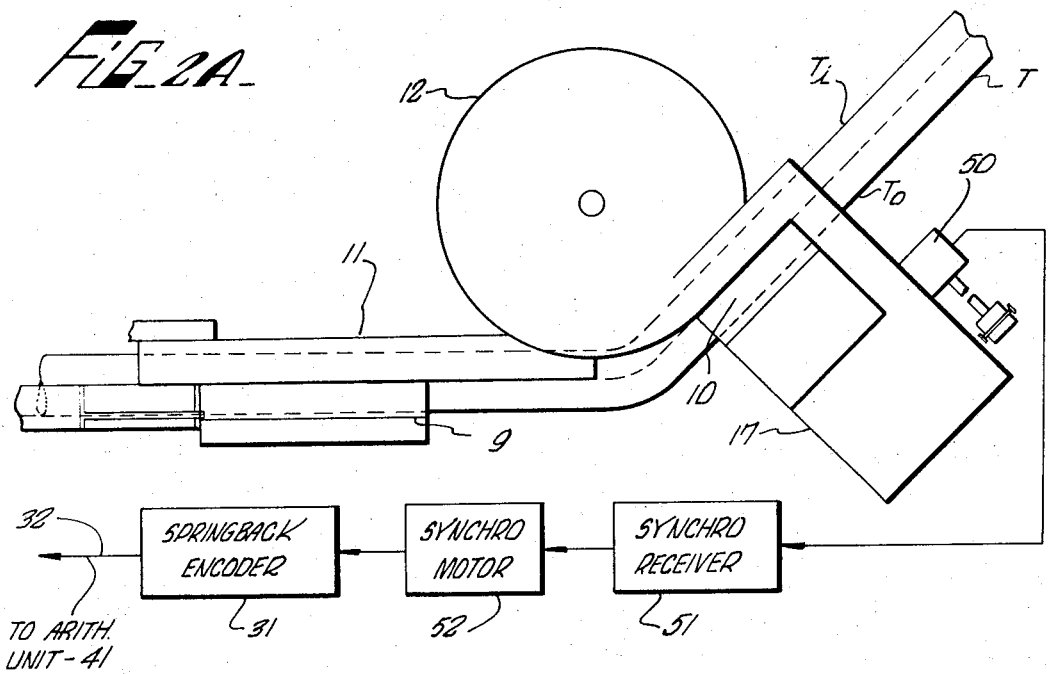
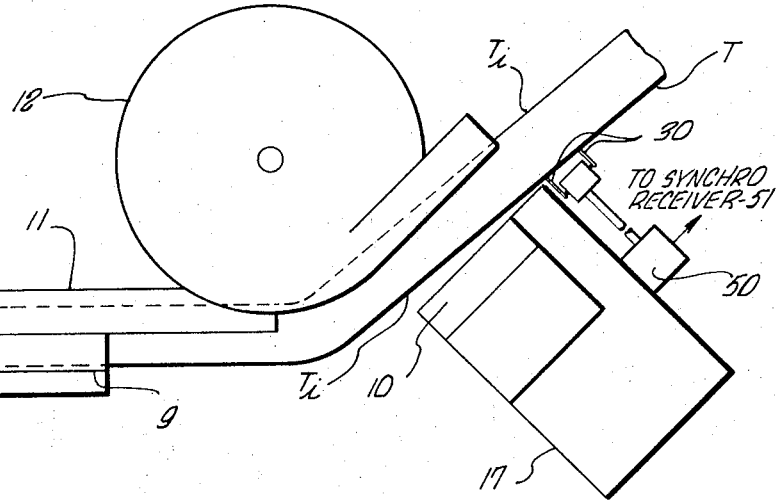
INVENTOR.
KENNETH W. CLARKE
BY
ATTORNEYS.

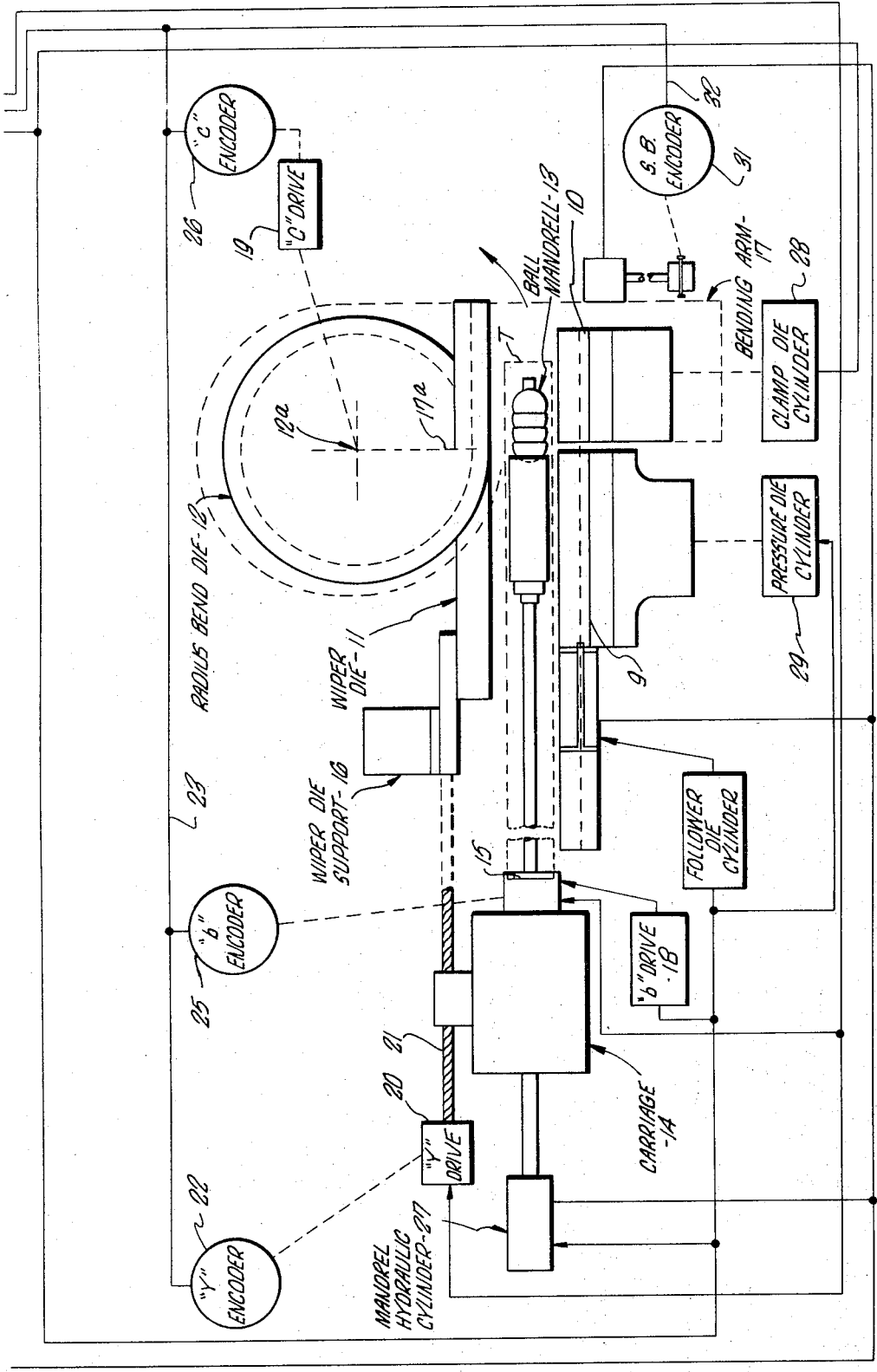

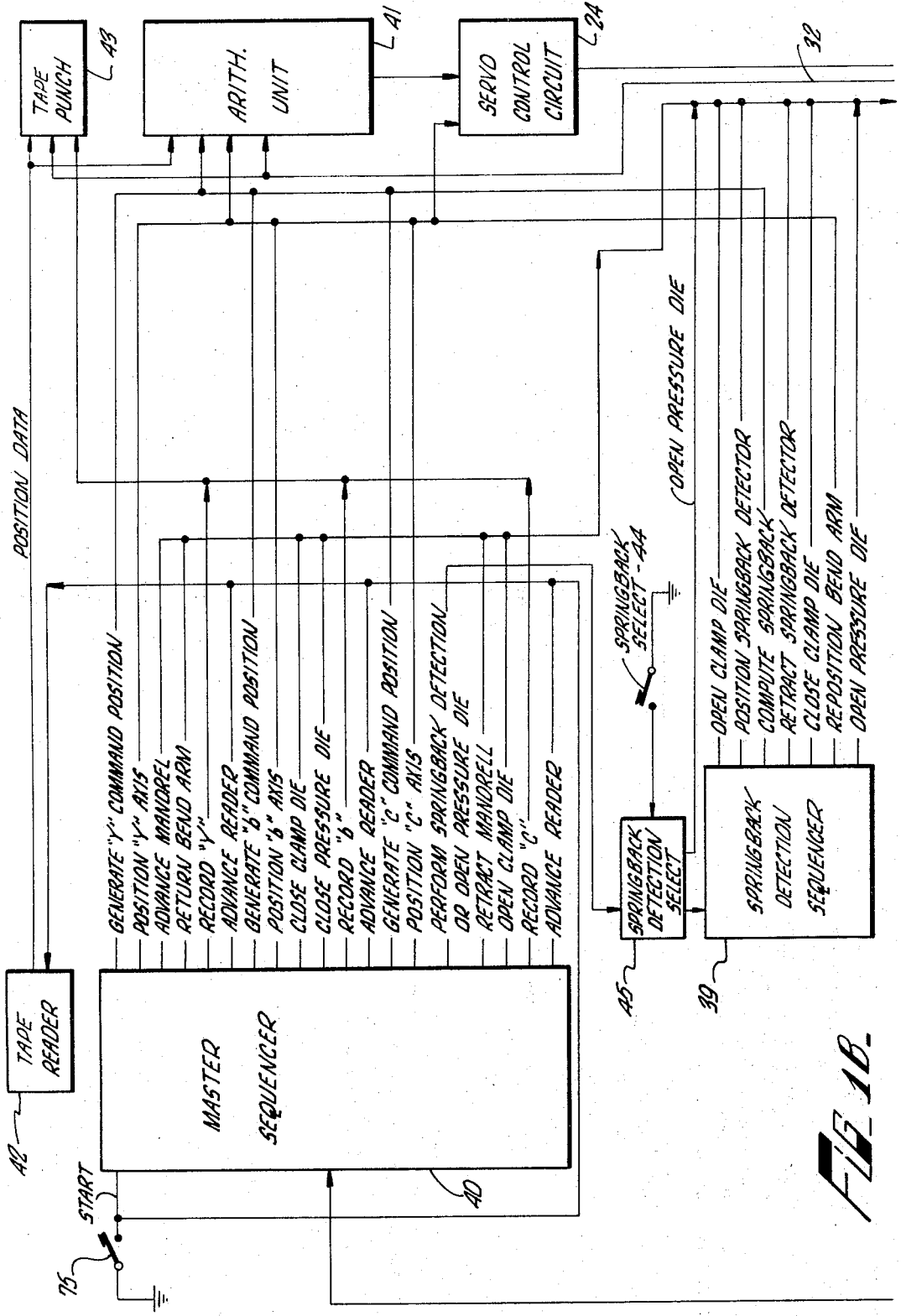

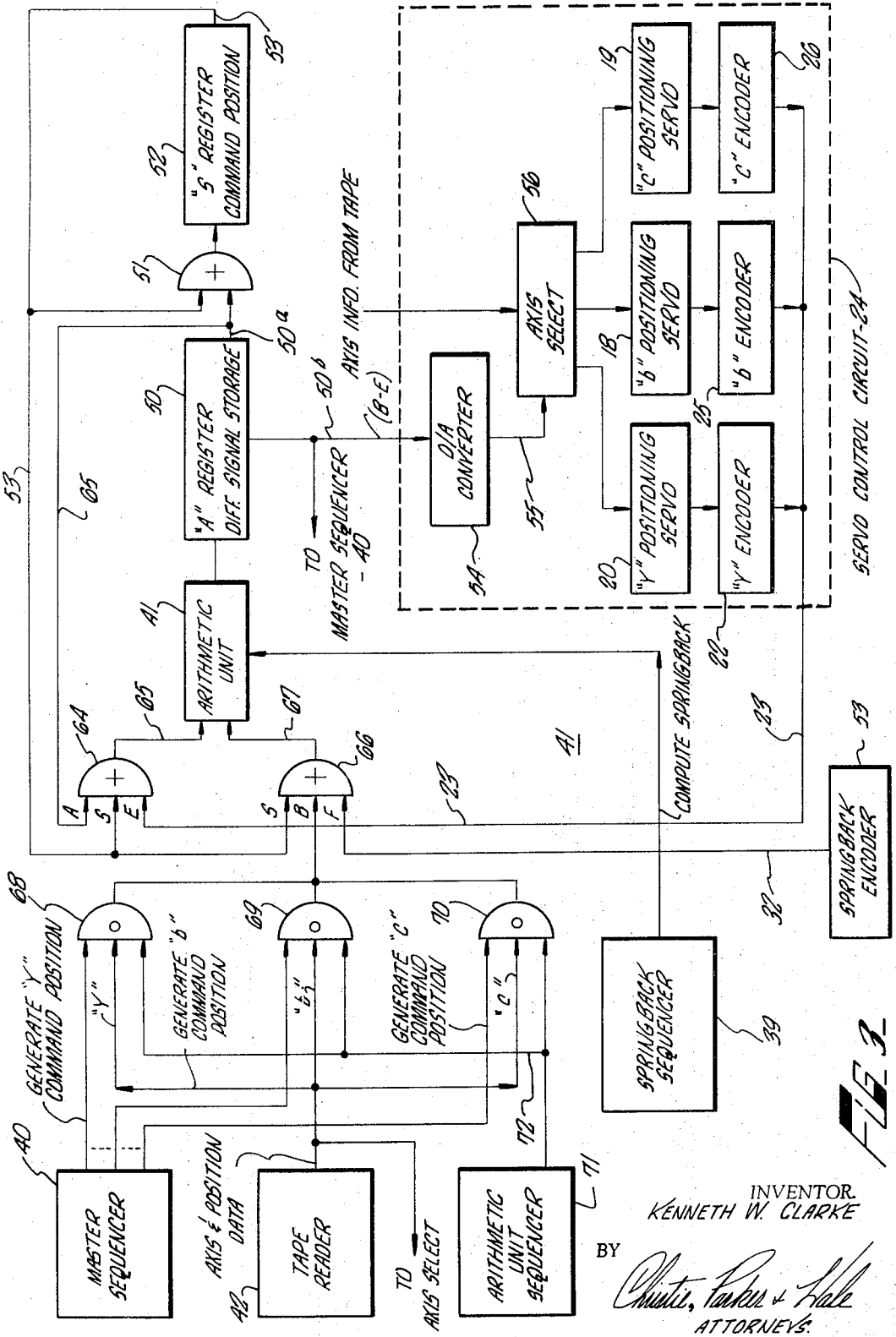

United States Patent Office 3,352,136
Patented Nov. 14, 1967

3,352,136
METAL FORMING MACHINE
Kenneth W. Clarke, Arcadia, Calif., assignor, by mesne assignments, to Conrac Corporation, New York, N.Y., a corporation of New York
Filed Mar. 22, 1965, Ser. No. 441,548
21 Claims. (Cl. 72—9)

ABSTRACT OF THE DISCLOSURE

A metal forming machine tool that is automatically controlled to form a workpiece subject to springback and to automatically detect the actual formed workpiece for automatically commanding the reforming of the workpiece to compensate for the springback.

The metal forming machine is fully automatically controlled and includes automatic means for positioning the workpiece to effect the desired forming operation and automatically commanding the metal forming operation. The automatic control means includes means for detecting the actual physical configuration of the formed workpiece and providing an electrical signal thereof. This signal is utilized for calculating a new forming command that includes a compensation for the detected springback and automatic means responsive to the thus formed command signal for reforming the workpiece to obtain the desired formed configuration.

---

This invention relates to metal forming machine tools adapted to form workpieces subject to springback. The present invention is particularly useful with automatic control systems for the forming of a workpiece resulting in the automatic correction for springback in machine tools of the type classed as tube benders, stretch presses, and the like.

Metal forming machines shape a workpiece through the application of a force applied thereto and which force exceeds the elastic limit of the workpiece but within the ultimate elastic limit of the workpiece. Tube benders, stretch presses, straighteners and roll formers are all machine tools falling within this metal forming category. Since the ultimate elasticity of the workpiece is not exceeded, the material will spring back some amount when it is unclamped or released about the formed area. Springback, then, can be defined as the tendency of a material which has been formed to return to its original shape. After the forming or bending of a tube, the tube will springback over a range of from 0.1 through 28 degrees, depending on the radius of the bend. This springback, of course, produces a part that falls outside of the desired or commanded form for the workpiece and the part may be unacceptable for use without correction for springback. The forming process itself introduces a number of variables that effect the amount of springback. In a tube bender, for example, the variables that effect the springback of the tube include the radius of the bend, the tube diameter, the tube wall thickness, the chemical composition of the tube, the temperature of the tube, and the tooling tolerances. The tool setup itself introduces variables that effect springback through the setup of the mandrel position, the normal follower die pressure, the follower die assist and the wiper die rake angle.

The manual operation of machine tools, including the metal forming tools, require highly skilled operators and relatively long production runs. As in the metal cutting machine tools, automatic controls or numerical control circuits have been developed to automatically position the workpiece and the tool and the automatic machining operation. These types of controls have been developed for the metal forming machine tools, including tube benders. Even though the machine tool forming operation has been automated, in general, no automatic control and/or numerical control system has been developed that includes means for automatically correcting for the springback of the workpiece. When no such control arrangement is provided with these metal forming machines, a master workpiece must be provided as a reference to allow subsequent workpieces to be compared against the master. It will, of course, be appreciated that a large amount of time and material is required to prepare a master workpiece when pieces having a multiplicity of forms and variable forms are required in a manufacturing operation. The automatic provision for springback correction will eliminate the need for the master workpiece and the time and material required to produce the master.

The present invention provides an improved metal forming machine tool that may be automatically controlled through numerical control circuits for forming a workpiece subject to springback and automatically producing a workpiece that is corrected for springback and thereby provide a part that has the desired or programmed form. As in the prior art numerical control circuits, the automatic metal forming operation is controlled through the provision of a control member or control tape that commands the machine tool to effect the desired forming operation. In accordance with the teachings of the present invention, the control includes means for automatically detecting the degree of springback and automatically reforming the workpiece to compensate for the detected springback and thereby providing an acceptable part. In addition, a new control member or tape may be generated for use in subsequent forming operations on similar workpieces or tubes.

The disclosed apparatus for inspecting the dimensional accuracy of a formed workpiece eliminates the need for special jigs, master workpieces and skilled inspectors. The corrected control member or paper tape may be considered equivalent to the master or reference workpiece whereby the numerically controlled metal forming machine tool may be considered as a primary standard for the inspection of the desired form in the workpiece.

The numerical control circuit of the present invention is particularly adapted for use with a tube bender wherein the actual springback angle is detected and if outside predetermined tolerance a new angle of bend is calculated that is compensated for the detected springback of the tube, and then goes on to automatically command the tube bender to reform or rebend the tube in accordance with the new command including the calculated correction to thereby provide a tube having the desired angle of bend.

From a structural standpoint, the present invention comprises a numerically controlled metal forming machine tool including numerical control means for automatically actuating the machine to form a workpiece subject to springback to a desired shape and controlling the workpiece whereby it springs back. A rotatable sensing finger is then automatically controlled to be positioned into and out of engagement with the formed portion of the workpiece whereby in the event of springback it is rotated an amount representative of the actual springback angle. The rotatable sensing finger is arranged with means for generating a numerical control signal representative of the springback angle. The numerical springback control signal is applied to an arithmetic unit for generating a corrected bend signal that compensates for the detected springback. A compensated command signal is then utilized to command the machine tool to reform or rebend the workpiece in accordance therewith whereby the workpiece assumes the desired shape. During this procedure a new control tape or control member is prepared and may be employed in subsequent runs on workpieces having the same shape or form.

These and other features of the present invention may be more fully appreciated when considered in the light of the following specification and drawings, in which:

FIG. 1. is a diagram showing the interrelationship of FIGS. 1A and 1B;

FIG. 1A is a partial, top plan view of a typical tube bender employing the automatic control system of the present invention;

FIG. 1B is a block diagram of the automatic control system for compensating for tube springback for use with the tube bender of FIG. 1A and embodying the invention;

FIG. 2A is a partial plan view of the tube bender of FIG. 1A illustrating a bent tube in its final, clamped position before it is allowed to springback;

FIG. 2B is a partial plan view of the tube bender illustrated in FIG. 1A, with a bent tube shown in a sprung back position with the springback detecting structure associated therewith;

FIG. 3 is a block diagram of the servo control circuit illustrated in FIG. 1A;

FIG. 5 is a block diagram illustrating the operations controlled by the springback detection sequencer illustrated in FIG. 1A.

Figure 4:
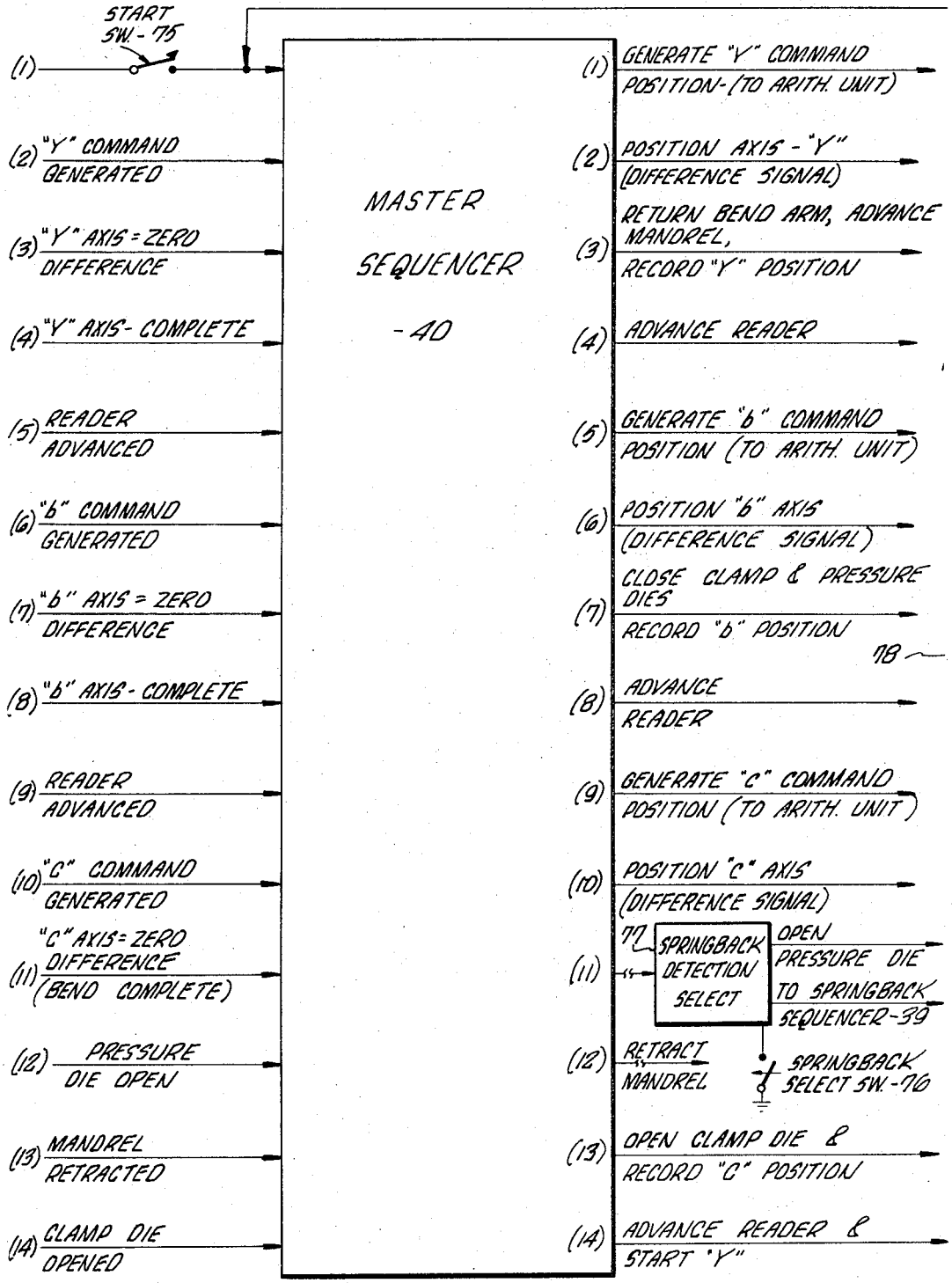
FIG. 4 is a block diagram illustrating the operations controlled by the master sequencer illustrated in FIG. 1A.
Figure 6:
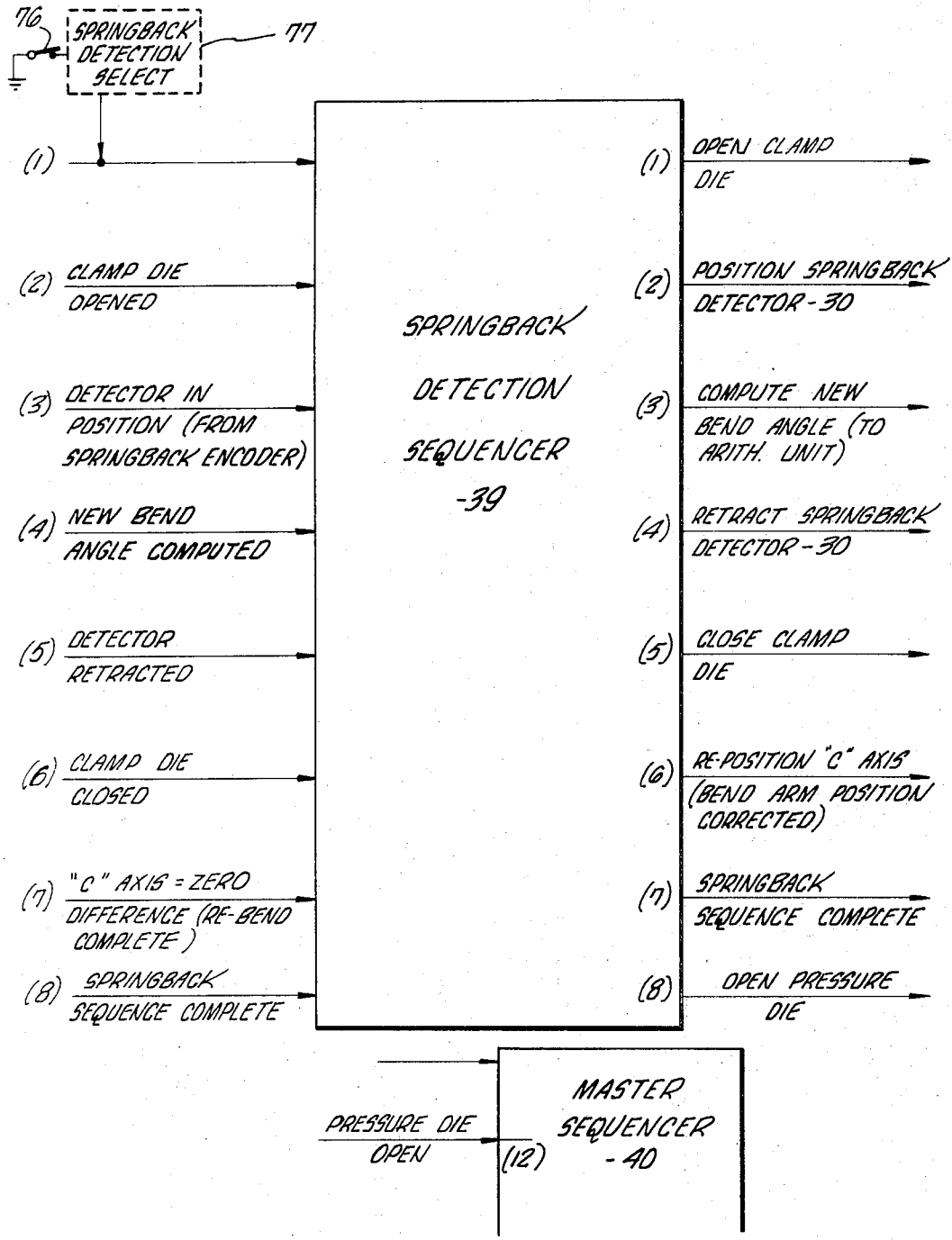

Although the present invention can be used with most metal forming machine tools such as tube benders, stretch pressers, and the like, wherein the formed workpiece is subject to springback, for the purposes of the present disclosure the invention can be best described as it is applied to a more or less conventional tube bending machine tool and, more particularly, to a tube bender that is adaptable to numerical control. The numerical control of the metal forming machines, such as tube benders, is known to the art and, therefore, the numerical control arrangement for the tube bender will be described only to the extent necessary for the complete appreciation of the invention. Specifically, the springback compensation control arrangement will be described as it is integrated into a conventional numerical control circuit for a tube bender. It should also be appreciated that the concept of the present invention may be implemented by analog controls.

The basic primary tooling for a tube bender that is controlled from the numerical control circuits comprises a clamp die, a pressure die, wiper die and a radius bend die. As in the usual machine tool numerical control arrangement, the workpiece or tube must be controlled relative to the tooling for positioning and forming the workpiece to the desired shape. As in the metal cutting machine tools, three degrees of translational freedom must be controlled from the numerical control system and these three degrees of translational freedom, or three axes, are identified as the "$y$," "$b$" and "$c$" axes. The $y$ axis in the tube bender to be described represents the lineal motion of the carriage and which motion may be further characterized as the absolute distance to bend, ADB, or distance between bends, DBB. The absolute distance to bend represents the absolute distance from the tangent point of the bend to a reference point on the tube as related to an absolute point of reference on the machine, while the DBB represents the distance between tangent points of adjacent bends on a single piece of tubing. The $b$ axis is also referred to as the POB, or the plane of bend. This $b$ axis can also be considered the direction of rotation of the tube around the $y$ axis. The $c$ axis represents the degree of bend, DOB, and is representative of the rotation around the $z$ axis or the desired angle of bend that is programmed into the control network.

In the numerical control arrangement to be described, it is the $c$ axis or the programmed angle of bend that is corrected through reprogramming to compensate for the detected springback and accordingly, for any one bend on a tube, the $y$ axis follows the reprogrammed position. The $b$ axis is maintained in its programmed position during the rebending phase. The positioning of these three degrees of translational freedom are generally sequentially controlled and positioned in the tube bender. However, it should be appreciated that these axes may be simultaneously positioned when the invention is applied to a stretch press, for example.

Now referring to the drawings, the invention will be described in more detail. Referring specifically to FIG. 1A wherein the principal component members or primary tooling elements of a tube bender are diagrammatically outlined in the plan view, it will be seen that the basic primary tooling comprises a pressure or follower die 9, a clamp die 10, a wiper die 11, a radius band die 12 and a ball mandrel 13 controlled by a carriage 14. In addition, a collet 15 for mounting the tube T to be bent is provided and which tube T is shown in dotted outline mounted on the collet 15 and over the ball mandrel 13. The wiper die 11 is further illustrated with a wiper die support 16. Since the tube bender is of the revolving die or draw bender type, the tube T is bent by rotating the bending arm 17 to a preselected angle or about the $c$ axis. The bending arm 17 is rotated, or pivoted, about the center point of the radius bend die 12, or the point identified by the reference character 12$^a$. The rotation of the bending arm 17, is illustrated in FIG. 1A for a left-hand machine, is in a counterclockwise direction about the point 12$^a$. Accordingly, the angle of bend is referenced to the at rest position of the bending arm 17, as illustrated, and is measured from this position in a counterclockwise direction about the dotted line 17$^a$.

As in the conventional tube bending machines, the basic tooling elements are each defined to accommodate the various diameters of tube to be bent and desired bend radii. The clamp die 10 receives one side wall of the tube T and is clamped thereagainst when the machine has been controlled for a bending operation. In the same fashion, the radius bend die 12 is undercut to accommodate the tube T so that when the tube T is clamped between the radius bend die 12 and the clamp die 10 the tube will be bent around the radius bend die 12 in response to the bending force applied thereto through the rotation of the bending arm 17. The working position of the mandrel 13 during the bending interval is that the outer end of the mandrel 13 is positioned adjacent the extremity of the portion of the tube to be bent, as is well known to those skilled in the art. The pressure or follower die 9 is positioned against the wall of the tube T to maintain the portion of the tube T extending outside of the portion to be bent against the clamp die 10 during bending.

Each of these tube bender tooling elements are provided with a control element, such as a hydraulic cylinder, for controlling the position thereof, as is conventional. The carriage drive is identified as the $y$ drive 20 controlling a lead screw 21 mounting the carriage 14. The longitudinal movement of the hydraulic cylinder comprising the $y$ drive 20 is effective in controlling the lead screw 21 and thereby longitudinally positioning the carriage 14 in the conventional fashion. The $y$ drive 20 is controlled from the numerical control circuit and for this purpose an encoder 22 is coupled to the $y$ drive 20 for generating a numerical or digital signal representative of the actual position of the carriage 14. The encoder 22 is diagrammatically illustrated as coupled to the $y$ drive 20. The position signal generated by the $y$ encoder 22 is coupled by means of the lead wire 23 to the arithmetic unit 41 and the tape punch 43; see FIG. 1B. In the same fashion, the plane of bend, or $b$ axis, is controlled and its position indicated through the provision of an encoder 25 coupled to be responsive to the rotation of the collet 15. The output indication from the encoder 25 is also coupled by means of the lead wire 23 to the arithmetic unit 41 and the tape punch 43. The remaining axis, or the c axis, is controlled through the provision of the c encoder 26 coupled to be responsive to the bending arm 17, as illustrated. The digital output signals from the c encoder 26 are also coupled to the arithmetic unit 41 and the tape punch 43.

Individual signals from the numerical control circuit to be described control the positioning of the mandrel 13, the position of the bend arm 17 and the opening and closing of the clamp die 10, and pressure die 9. The wiper die 11 is stationary. The positioning or the retraction and advancement of the mandrel 13 is accomplished through a mandrel hydraulic cylinder 27 in turn controlled through the numerical control circuit proper. In the same fashion the positioning controls or the hydraulic cylinders for the remaining elements are also controlled. The clamp die cylinder is identified by the reference character 28, while the pressure die 9 cylinder is referenced by the character 29.

The tube bender and, in particular, the bending arm 17 for the purposes of the present invention mounts a springback detector 30 on the side wall of the bending arm 17 and thereby out of the path of the tube T when it is in a clamped relationship with the die elements of the tube bender. The springback detector 30 is mounted to be positioned into and out of engagement with the bent or formed portion of the tube T for detecting the degree of springback and providing a digital signal representative of the angle of springback. For this purpose, the springback detector 30 is pivotally mounted and controlled to be positioned adjacent the side wall of the tube T and rotated in response to the engagement with the side wall of the tube to align itself therewith thereby assuming an angle identical to the angle of bend, as will be described more fully hereinafter. In the particular construction under consideration, the springback detector 30 is mounted with a synchro that is rotated in response to the rotation of the springback detector 30 and in turn rotates the shaft of a springback encoder 31 providing the digital signal indicative of the degree of springback of the tube, the angle of bend signal is coupled to the arithmetic unit 41 and tape punch 43 by means of the lead wire 32.

Now referring to FIG. 1B, the general organization of the numerical control circuit including the arrangement for automatically correcting for springback will be described. The positioning of the basic tooling elements of the tube bender are controlled by means of a master sequencer 40. The master sequenced 40 functions essentially in the same fashion as a stepping switch in that it commands a particular function at each step of the switch. In this instance, the sequencer 40 is stepped between positions in response to a feed back signal indicating that the function commanded from the adjacent step has been completed. Coacting with the master sequencer 40 is an arithmetic unit 41 that is connected to be responsive to certain commands from the master sequencer 40 in combination with the signals derived from a source of numerical control signals shown as the paper tape reader 42. The arithmetic unit 41 in turn provides control signals to the servo control circuit 24 that functions to position along the various axes $y$, $b$ and $c$ of the tube bender. The servo control 24 is also responsive to the positioning signals from the master sequencer 40.

The aforementioned elements also coact with a springback detection sequencer 39 which is operative when it is desired and necessary to compensate for the springback of a workpiece. The springback detection sequencer 39 is directly operative in response to a command from the master sequencer 40. The springback detection sequencer 39 is of the same general type of sequencer as the master sequencer 40 and comprises all the control logic for detecting the degree of springback and the commands to rebend the tube T to compensate for springback. Accordingly, the output signals from the springback detection sequencer 39 are coupled to the servo control circuit 24 as well as the arithmetic unit 41.

A tape punch 43 is provided and is connected to be responsive to the positioning signals for recording the numerical value of the positions along the $y$, $b$ and $c$ axes. The position of the $c$ axis for the corrected bend arm position is the recorded position. Once the tube is bent and the axes are recorded by means of the tape punch 43, a new control member or control tape will have been generated and this new control tape may be applied to the tape reader 42 to control the bending of tubes that have the same form as the tube from which the new tape has been prepared. In order to take advantage of the springback detection compensation arrangement, it is necessary to actuate a springback selection switch 44, and which switch in its closed position allows the springback selection switching circuit 45 to be rendered operative for actuating the springback detection sequencer 42.

Now referring to FIGS. 2A and 2B, the arrangement for detecting and encoding the actual angle of bend will be described. As in the normal tube bending operations, the tube T undergoing bending is tightly clamped between the various die elements and when it is clamped, it will maintain the tube T in its bent position, see FIG. 2A. In order to detect the degree of springback, the tube or workpiece must be released to allow it to relax or springback. For this purpose, the clamp die 10 is opened, as illustrated in FIG. 2B wherein the tube T is illustrated in its sprung back position. If it is assumed that the commanded or desired angle of bend is 45 degrees and that when this angle of bend is correctly formed, the center line of the tube T coincides with the line defining the 45 degree position. The 45 degree position is measured from the horizontal line coincident with the center line of the tube T. As illustrated, the inside surface of the tube T, or the surface identified by the reference character $T_i$ lies adjacent to this 45 degree position and the center line of the tube T is therefore displaced or sprung back in a clockwise direction therefrom.

The springback detector 30 essentially comprises a pair of spaced sensing fingers of a unitary construction that is pivotally mounted with a synchro transmitting unit 50. The springback detector 30 is mounted on the bending arm 17 out of the path of the tube T during the bending operation and is positioned adjacent the bent portion of the tube T for the purpose of detecting the angle of springback, as illustrated in FIG. 2B. The springback detector 30, then, is adjusted initially to assume a position adjacent the wall of the tube T corresponding to no springback. For this purpose, the adjustment of the springback detector 30 is to cause the sensing fingers thereof to assume a position parallel to the face of the clamp die 10 and would therefore be parallel to the bent tube if it did not spring back. Since same amount of springback is encountered, when the sensing fingers engage the tube wall $T_o$, they will be rotated an amount corresponding to the degree of springback. Accordingly, the sensing fingers will be rotated so that they lie in a plane parallel to the wall $T_o$ and thereby rotate the synchro transmitter 50 through an angle corresponding to the degree of springback. The synchro transmitter 50 coacts with a synchro receiver 51 which receives the degree of springback signal and in turn applies it to actuate a synchro motor 50 which has its shaft rotated an amount corresponding to the degree of springback. It will be appreciated that the construction of the synchro transmitter 50 and receiver 51 are of conventional construction. The synchro motor 52, in turn, controls the position of the shaft of an encoder 53 denoted as the springback encoder, and which encoder provides the digital output indication representative of the degree of springback which is coupled to the arithmetic unit 41. It should be appreciated that the digital signal coupled to the arithmetic unit 41 representative of the degree of springback is utilized therein along with the desired angle of bend or the angle commanded from the control tape to generate a new angle of bend, as will be explained more fully hereinafter.

The compensation for springback, in accordance with the teachings of the present invention, includes a second order compensation. Stated differently, it is recognized that springback will occur on a workpiece not only after the first bend, but also after the second and subsequent bends, and the corrected bend angle generated by the arithmetic unit 41 takes into account both of these springbacks. Stated arithmetically, the springback correction upon which the arithmetic unit 41 is operative to generate the corrected bend command is as follows:

$$F^2/B + F + B$$

wherein F represents the springback angle detected by the springback detector 30 and B is representative of the commanded angle of bend or the desired angle of bend. The commanded angle of bend, of course, is derived directly from the control tape and is provided from the tape reader 42. The addition of the springback angle F, to the command angle represents the first order correction while the addition of the expression $F^2/B$ represents the second order correction.

The difference signals generated from the arithmetic unit 41 result from the application of the signals from the encoders associated with the y, b and c axes that are subtracted from the numerical signals representing the desired positions.

Now referring to FIG. 3, the arrangement of the arithmetic unit and its logical controls along with its association with the servo control circuit 24 will be explained. The arithmetic unit 41 may be of conventional construction and as such is adapted to carry out the arithmetic functions of addition, subtraction, multiplication and division. The electronic computation of these arithmetic processes are well known to the art and, for example, the arithmetic unit need only be an adding unit and yet perform all the other arithmetic functions. For this purpose, subtraction can be accomplished by addition of a number and the complement of the number to be subtracted therefrom, while multiplication can be performed by over and over addition and in the same fashion, division is effected by multiple subtractions. The output operand or result from the arithmetic unit 41 is shifted into an A register 50. As is appreciated by those skilled in the art, a shift register is a serial operating device and the information should be considered to be shifted into the A register 50 serially by decimal digit and in terms of four parallel binary characters or bits. Of course, the arithmetic unit 41 operates in the same serial by digit, parallel by bit fashion. The information stored in the A register 50 is derived therefrom a pair of output circuits 50A and 50B. The output signals appearing on the line 50A are coupled as an input signal for the OR circuit 51 and which OR circuit has its output line connected to an S shift register 52. The other input for the OR circuit 51 is derived from the output line 53 of the S register 52. The output line 50B from the A register 50 is connected to the servo control circuit 24.

The servo control circuit 24 is more or less a conventional digital servo unit that is presently employed in numerical control circuits for machine tools, and is operative on the digital difference signal appearing on the lead wire 50B. The difference signal appearing on the lead wire 50B is generated by the arithmetic unit 41 and is normally stored in the A register 50. This stored signal represents the difference between the actual position along one of the axes y, b or c and the commanded position of the selected one of these axes as derived from the tape. The servo control circuit 24 positions the selected machine member along the selected axis until the difference signal is zero. The difference signal appearing on the line 50B is illustrated as the (B—E) signal, wherein B represents the commanded position and E represents the encoder position or numerical signal representative of the actual position along an axis.

Specifically, the servo control circuit 24 includes a digital-to-analog converter 54 which receives the digital input signal from the input line 50B and converts it to a corresponding analog signal. This analog signal represents the control signal for positioning the selected axis to the desired position and is coupled by means of a lead wire 55 to a unit identified as the axis select unit 56. The axis select unit 56 also receives the axis positioning information from the control tape as provided by the tape reader 42. The tape provided with the tape reader 42 is coded in the conventional fashion to indicate the axis for the associated numerical information. Accordingly, the axis select unit 56 will switch the analog signal on the line 55 to the selected y, b and c positioning servo to actuate the selected servo. The y, b and c positioning servos are identified by the reference characters 20, 18 and 19, respectively. Each of these positioning servos is provided with an individual encoding unit that is controlled from the servo and is rotated by the corresponding servo units whereby the output of the encoder is a digital signal that is representative of the actual position of any one axis. The corresponding y, b and c encoders are identified by the reference characters 22, 25 and 26. These encoder signals are each coupled as an input signal for the arithmetic unit 41 through the provision of a lead wire 23 and is connected as an input signal E to the circuit 64. The remaining input signals to the OR circuit 64 are derived from the A register 50, signal a, and the S register 52, signal s. The output from the A register 50 appearing on the lead wire 50A is coupled in parallel circuit relationship by means of a lead wire 65 as one input of the OR circuit 64 which input signal is identified by the reference letter A. The input signal identified as the s signal is coupled to the OR circuit 64 by means of the lead wire 53. The occurrence of any one of these signals as an input signal to the OR circuit 64 will provide an output signal on the output lead wire 65 for the OR circuit 64 and will appear as an input signal or one of the signals to be operated on by the arithmetic unit 41.

The remaining operand for the arithmetic unit 41 is derived from the output circuit of the OR circuit 66, having an output lead wire identified by the reference numeral 67 connected between the OR circuit 66 and the input of the arithmetic unit 41. The three input signals that are coupled to the OR circuit 66 are identified as the input signals S, B and F. The S input signal is the signal stored in the S register 52 and is derived from the lead wire 53, being coupled to the input of the OR circuit 66 in parallel circuit relationship with the input to the OR circuit 64. The F signal is representative of the springback angle and is provided from the springback encoder 53 as previously discussed hereinabove. The third input signal or the b signal is representative of the numerical control signal or command signal derived from the tape reader 42. This command signal is applied to the OR circuit 66 under the control of a logical network comprising the AND circuits 68, 69 and 70. Each of the output circuits from these AND gates are connected in parallel circuit relationship to provide the B input to the OR circuit 66.

Considering the AND circuit 68 for the present and the input signals required to appear in coincidence before a signal will be derived at the output circuit thereof, it will be seen that one of the output signals from the master sequencer 40 is the signal noted as the generate y command position and this signal is applied as one input signal to the AND circuit 68. Coincidently therewith, the numerical control information representative of the desired y axis position is derived from the reader 42 and applied to the AND circuit 68. The remaining input signal is a clocking signal derived from the arithmetic unit sequencer 71. The arithmetic sequencer 71 can be considered to be a clock pulse source and provides a clock pulse on its output circuit 72 that is coupled in parallel circuit relationship as an input signal to each of the AND circuits 68, 69 and 70. It should now be appreciated that the B signal representative of the desired $y$ axis position will be applied to the OR circuit, 66 and in turn to the arithmetic unit 41 only when the master sequencer 40 has been switched to the position corresponding to the generate $y$ command position. Simultaneously therewith the tape reader 42 will have been positioned to read the numerical information from the tape corresponding to the desired $y$ axis position. The occurrence of the clock pulse will enable the AND gate 68 only during this interval, while the remaining gates 69 and 70 will be disabled, as will be more fully appreciated immediately hereinafter.

The input circuit organization for the AND circuits 69 and 70 are arranged in the same general fashion as for the circuit 68. To this end, a generate $b$ command position signal is derived from the master sequencer 40 and directly coupled to the AND gate 69, while the generate $c$ command position is subsequently derived from the master sequencer 40 and coupled to the AND circuit 70. The numerical information representative of the desired position of the $b$ and $c$ axes are provided from the tape reader 42 in sequence and coupled to their respective AND circuits.

To effect the desired computation to correct for springback, the arithmetic unit 41 must be triggered to enable it to compute the corrected bend command signal. For this purpose, the output of the springback sequencer 39 provides a compute springback signal to the arithmetic unit 41 which is effective to initiate the computation in accordance with the above described formula derived for correcting springback to the second order, namely, the formula $$\frac{F^2}{B}+F+B$$

With the above structure of the arithmetic unit in mind, the operation of the arithmetic unit 41 and its associated networks, as illustrated in FIG. 3, will be described. In the sequence of operations controlled by the master sequencer 40, the first operation effected is the positioning of the various tool elements in accordance with the $y$, $b$ and $c$ axes described hereinabove. It will be assumed that the first position controlled is the $y$ axis and, accordingly, once the master sequencer 40 generates the command-generate $y$ command position, the tape reader 42 will be providing the $y$ command or the desired position along the $y$ axis. Simultaneous with the occurence of the clock pulse from the arithmetic unit sequencer 71, this information will be applied to the arithmetic unit 41 through the OR circuit 66. If it is considered that the absolute degree of bend, ADB, is the mode of operation along the $y$ axis, the desired position will be merely shifted through the arithmetic unit 41 and through the A register 50 and will be stored in the S register 52. This information should correspond identically to the numerical information previously recorded on the tape for the desired position along the $y$ axis. The $y$ axis is positioned at this commanded position through the operation of the servo control circuit 24. For this purpose, the positioning is effected by means of the provision of the digital signal derived from the $y$ encoder 22 indicating the actual position along the $y$ axis. This encoder signal is coupled as an input signal to the OR circuit 64 and, accordingly, represents one of the operands applied to the arithmetic unit 41. The commanded position along the $y$ axis is stored in the S register 52 and is represented as the signal S at the input to the OR circuit 66, and, in turn, at the output circuit 67 to represent the other operand upon which the arithmetic unit 41 is operative. A subtraction operation occurs within the arithmetic unit based on these two operands whereby the output signal from the arithmetic unit 41 represents the difference between the desired position and the actual position along the $y$ axis, or the $(B-E)$ signal. This $(B-E)$ signal is stored in the A register 50 and is coupled by means of the lead wire 50B to the servo control circuit 24.

This digital difference signal is converted to an analog signal by a digital-to-analog converter 54, and is switched to the $y$ positioning servo 20 through the axis select circuit 56 due to the provision of a numerical control signal from the tape reader 42 that identifies the position command information as the $y$ axis information. This energization of the $y$ positioning servo 20 moves the carriage 14 along the $y$ axis until the desired position is reached. This desired position is signalled by the fact that the difference signal $(B-E)$ is zero. At this time, the $y$ encoder output signal is identical to the numerical command stored in the S register 52, while the A register 50 stores the zero difference signal.

In the same fashion, the $b$ and $c$ axes are controlled in response to the stepping of the master sequencer 40 in providing the generate $b$ command position and the generate $c$ command position. These signals, of course, are synchronized with the reading of the information from the control tape at the tape reader 42 to correlate the numerical command information with the correct axis.

Now referring to FIG. 4, a detailed examination of the master sequencer 40 will follow. The master sequencer 40, as mentioned hereinabove, is essentially a stepping switch type of device or performs a ring counter type of operation. The sequencer 40, however, is stepped from position to position in response to a feed back signal that indicates that the previous command has been completed and steps the sequencer to initiate the next command. For this purpose, the master sequencer 40 is actuated or started through the provision of a manual start switch 75. In addition, the master sequencer 40 has its operation controlled by means of springback select switch 76 for controlling a springback detection selecting circuit 77 which may be a bi-stable circuit that is normally positioned not to select the springback sequencer 39. Stated differently, with the springback select switch 76 in the open position, as illustrated, the signal derived from the master sequencer 40 and applied to the springback detection selecting circuit 77 will cause the pressure die 9 to be opened. When the springback selector switch 76 is closed, the springback detection select circuit 77 is switched whereby the signal from the master sequencer 40 is directed to the springback detection sequencer 39 to start the springback detection sequence, as will be described more fully immediately hereinafter.

The step by step sequencing of the master sequencer 40 may now be considered. The initiation of the sequencing operation is effected by the operator pressing the start switch 75. With the initiation of the operation of the master sequencer 40, the first command controlled therefrom is the generate $y$ command position that is applied to the arithmetic unit 41. When this $y$ command has been generated by the arithmetic unit 41, the feed back signal indicative thereof is connected to the second position of the master sequencer 40 to step it to its next position. The command corresponding to step two of the master sequencer 40 is the numerical position desired along the $y$ axis. It is during this interval that the difference signal $(B-E)$ is generated until a zero difference signal is obtained. When the zero difference signal is obtained indicating the desired $y$ position has been reached, this signal is coupled into the third stage of the sequencer 40 and switches the sequencer to command the third command which returns the bend arm to its normal position, or the position illustrated in FIG. 1A, and advances the mandrel 13 within the tube T along with initiating the recording of the position along the $y$ axis by means of the tape punch 43. This sequence completes the necessary operations along the $y$ axis and as a result a $y$ axis complete signal is fed back to the master sequencer 40 at stage four thereof. This feed back signal, then, switches the master sequencer 40 to provide a command corresponding to input 4 and which command advances the tape reader 42.

Once the reader is advanced to the location of the information for controlling the tooling along the $b$ axis, a reader advanced signal is fed back into stage four of the master sequencer 40. The corresponding output command at stage five is generate $b$ command position which is applied to the arithmetic unit 41. Once the $b$ command position has been generated by the arithmetic unit 41, the signal indicating the completion of this command is fed back at stage six and the sequencer 40 is stepped to command the next operation. The operation corresponding to stage six is positioned along the $b$ axis. Once again, this command is completed when the difference signal $(B-E)$ reaches zero, at this time, the zero difference signal is fed back to stage seven of the master sequencer 40 to switch it into stage seven and command the next operation from the output of stage seven. This operation comprises of closing the clamp and pressure dies and recording the digital output signal of the $b$ encoder 25 at the tape punch 43. With this latter operation complete, the operations along the $b$ axis have been completed and a signal has been fed back into stage eight. The stage eight output commands the advancement of the reader 42 and once it is advanced, stage nine is assumed by the master sequencer 40. At this position a generate $c$ command is applied to the arithmetic unit 41 and then, in response to the stepping through stage ten, the desired position along the $c$ axis is obtained. This, of course, is the bending operation, and when a zero difference signal is obtained, the bend is complete and a feed back signal so indicating is applied to stage elevel of the sequencer 40.

The output commanded from stage eleven is in accordance with the position of the springback select switch 76 and it will be assumed, for the present, that the switch has not been closed and, therefore, the pressure die 9 is commanded to be opened. This operation would correspond to the second bend of a tube wherein no springback correction is desired and the machine is controlled to bend the tube at the next location commanded by the tape. Alternatively, this may complete the bending operation on any one tube. With the compleion of command 11, stage twelve, thirteen and fourteen are sequenced to cause the mandrel to be retracted, the clamp die to be opened and the position or angle of bend along the $c$ axis is recorded. The last stage, stage fourteen, causes the reader to be advanced for subsequent bends, as mentioned hereinabove. If another bend is desired on the same tube, a signal is fed back from the output of stage fourteen as an input signal at stage one to re-position the tube for another bending operation. This type of operation may be programmed on the tape as a DBB operation by merely indicating the distance between bends. In this mode of operation, the difference in distance between bends is commanded and advanced. Of course, this can be effected by a ADB operation, as well.

With reference to FIG. 5, the operation of the springback detection sequencer 39 will now be described. For this purpose, it will be assumed that the springback selection switch 76 has been operated and, accordingly, the springback detection selection circuit 77 has been switched. As appreciated from the above discussion of the operation of the master sequencer 40, when the sequencer 40 rests at stage eleven, the command signal from stage eleven will initiate the operation of the springback detection sequencer 39. The springback detection sequencer 39 sequences or steps through eight different positions and then provides an output signal back to the master sequencer 40 as an input signal at stage twelve, thereby indicating that the springback sequence is complete.

The operation of the springback detection sequencer 39, of course, is necessary in order to detect the springback angle and correcting therefore. In order to effect this operation, then, it is first necessary to open the clamp die 10 and, accordingly, the initiation of the operation of the springback detection sequencer 39 results in the production of the first command therefrom, namely, the open clamp die command. Since the structural organization of the springback detection sequencer 39 is of the same general type as that of the master sequencer 40, namely, it is stepped from stage to stage by means of a feed back signal indicating that the previous command has been completed, accordingly, when the clamp die is opened, a signal is fed back into stage two switching the springback detection sequencer 39 to this stage. The output from stage two commands that the springback detector 30 be positioned for indicating the springback angle. This signal is applied to the arithmetic unit 41 as the digital signal from the springback encoder 31. With the springback detector 30 in position the sequencer 39 is stepped to stage three. At this time the arithmetic unit 41 is storing the digital signal representative of the springback angle and the signal from stage three of the springback detection sequencer 39 will condition the arithmetic unit 41, as discussed hereinabove in conjunction with FIG. 3, to perform the desired computation to generate a new command compensated for the detected springback, in accordance with the described formula. Once the new bend angle is computed, a signal is fed back from the arithmetic unit 41 to stage five of the sequencer 39 to step it into stage five and command that the springback detector 30 be retracted in order to allow the tube to be rebent. It should be appreciated that if no springback is detected, that the machine will automatically sequence through the springback detection sequence and reclamp but not rebend the tube and continue along the master sequencing program. Once the springback detector 30 is retracted, the sequencer 39 steps through stage five, six and seven and thereby closes the clamp die and initiates the rebending operation or re-positions along the $c$ axis in accordance with the new $c$ axis command signal computed by the arithmetic unit 41. The seventh stage of the sequencer 39 is triggered by the $c$ axis difference signal reaching zero, indicating that the rebend is complete and, accordingly, the output signal from stage seven indicates that the springback sequence is complete. The output signal from stage seven of sequencer 39 triggers stage eight to open the pressure die. The feedback signal indicating that the pressure die has been opened is coupled to stage twelve of the master sequencer 40.

With the above description of the component circuits of the control for the tube bender and their interrelationship in mind, the overall system operation for numerically controlling the tube bender and effecting a bend along with a springback correction will now be described.

It will be assumed that the machine operator has operated the springback select switch 76 to select the springback compensation sequence and then operates the start switch 75 to place the machine and the numerical control circuit in operation. As is evident from the above description, the initiation of the operation of the master sequencer 40 sequentially operates to position the machine tube bending elements along the three axes—the $y$, $b$ and $c$ axes. These operations are indicated in both FIG. 1B and FIG. 4. Referring to FIG. 4, in particular, it will be seen that the first ten positions of the master sequencer 40 deal with the positioning along the three axes and that when a zero difference signal for the $c$ axis is obtained at the input to stage eleven of the master sequencer 40, the first bend on the tube will have been completed. The output circuit for stage eleven is now under the control of the springback select switch 76 and, therefore, the output circuit for the springback detection selecting switch 77 initiates the operation of the springback detection sequencer 39 by providing a signal at the input of stage one thereof. The resulting command opens the clamp die 10, from the output circuit of stage one of the springback detection sequencer 39. After the clamp die 10 is opened and the appropriate feedback signal is applied to the second stage of the sequencer 39, the springback detector 30 is moved into engagement with the tube T, which has now sprung back, and senses the degree of springback by aligning itself with the wall $T_0$ of the tube T. This springback signal is eventually derived from the springback encoder 31 and applied to the arithmetic unit 41. The arithmetic unit 41 now computes the new position around the c axis, or the new angle of bend, to compensate for the detected springback and once this new bend angle is computed, the feedback signal resulting therefrom is applied to stage four of the sequencer 39. This signal causes the springback detector 30 to be retracted, the clamp die 10 to be closed and the c axis to be re-positioned at the new bend angle, respectively. At the completion of the rebending operation, the signal indicating the pressure die is open will be fed back to the master sequencer 40 at the input of stage twelve to complete the master sequencing program which involves the retraction of the mandrel 13, opening the clamp die 10, and recording the rebend position along the c axis at the tape punch 43. The final step in the master sequencer program 40 is the advancement of the reader 42 to its final position, or to the position for initiating a new bending operation at a different location on the tube. For this latter operation, a signal is fed back to the input of stage one of the master sequencer 40.

It should be noted that if the tube was to be bent a third time including detecting the degree of springback resulting from this third bending operation, that the difference between the desired angle of bend and the actual angle of bend will be in the order of a few seconds of arc, in view of the fact that the arithmetic unit 41 calculated the new angle of bend to the second order. This eliminates the necessity of subsequent detections of springback and the tube is bent within most industrial tolerances.

It should be appreciated that an important feature of the invention is the generation of a corrected control member, or corrected tape, that can be used for subsequent tube bending operations on tubes of the same type and having the same desired forms or bends. For this purpose, then, the corrected control tape may be substituted for the previous tape, and subsequent production runs of the same type may be controlled from this corrected tape without the necessity to go through a springback detection sequence resulting in an accompanying savings of time.

Although the springback detector need not be used once a given tube has been bent and corrected and the corresponding corrected control member has been generated, the springback detector may be programmed for use in subsequent bending operations as an inspection device. For this purpose, after the tube has been bent in response to the corrected command, the springback detector will signal the degree of springback to the arithmetic unit. This springback signal can be compared with the calculated springback and if not within preselected tolerances, the machine can be programmed to stop. The operator then knows he has an unacceptable part.

What is claimed is:

1. In a metal forming machine including means for forming a workpiece subject to springback to a desired shape, and automatic control means for detecting the actual form of the formed section of the workpiece and automatically reactuating the forming means in accordance with any springback to compensate for the springback.

2. In a metal forming machine including means for forming a workpiece subject to springback to a desired shape, means for detecting and generating a signal representative of the actual shape of the formed workpiece, means connected to said latter means to be responsive to the detected signal for computing a reforming control signal proportioned to compensate for the springback of the workpiece and connected to apply said reforming signal to said forming means to reactuate same in response thereto.

3. In an automatically controlled tube bender including means for automatically bending a tube, and automatic control means for actuating said bending means and for automatically rebending the tube in the event the angle of bend of the tube is to be compensated for tube springback.

4. In an automatically controlled tube bender as defined in claim 3 wherein said automatic control means includes means for detecting the degree of springback and signalling same.

5. In a numerically controlled tube bender including numerical control means for automatically bending a tube, and automatic control means for actuating said bending means for automatically rebending the tube to compensate for tube springback at a bend angle calculated to compensate for tube springback to a second order of springback.

6. In a tube bender including:
means for automatically bending a tube,
means for detecting and generating a signal indicative of the amount of springback of a bent tube, and
control means connected to said latter means for receiving the springback signal and calculating a corrected bend signal to compensate for the springback of said tube and connected to automatically actuate said first mentioned means to rebend the tube in accordance with the corrected bend signal.

7. In a tube bender as defined in claim 6 including means for generating a control member recording the signals to automatically bend similarly shaped tubes without the necessity for detecting the angle of springback.

8. In an automatically controlled tube bender including means for automatically bending a tube in response to a source of numerical control signals, means connected to be responsive to the completion of a bending operation for detecting and digitally indicating the springback angle of a bent tube, and control circuit means including arithmetic means connected to receive the springback signal to automatically compute a corrected bend control signal for rebending the tube to compensate for the springback in response to the springback angle signal and connected to automatically actuate said first mentioned means to rebend the tube in accordance with the corrected bend control signal.

9. In an automatically controlled tube bender as defined in claim 8 wherein said control circuit means comprises numerical control circuit means.

10. In a numerically controlled metal forming machine including numerical control means for automatically actuating the machine to form a workpiece subject to springback to a desired shape and allowing the workpiece to springback, a pivoted sensing finger mounted to be positioned into and out of engagement with the formed portion of the workpiece and pivoted to be rotated upon engaging the formed portion an amount correlated to the angle of springback, and means connected to be responsive to the rotation of said finger for generating a numerical control signal representative of the springback, said numerical control means being further defined for positioning the finger into and out of engagement with the workpiece and to receive and arithmetically process the springback signal to provide a new forming signal for automatically reactuating the forming means to reform the workpiece to thereby compensate for the springback when necessary.

11. In a numerically controlled metal forming machine including a source of numerical control signals, numerical control means connected to be responsive to said source for automatically actuating the machine to form a workpiece subject to springback to a desired shape and allowing the workpiece to springback, a pivoted sensing finger mounted to be positioned into and out of engagement with the formed portion of the workpiece and pivoted to be rotated upon engaging the formed portion an amount correlated to the formed portion, means connected to be responsive to the rotation of said finger for generating a numerical control signal representative of the sensed signal, said numerical control means being further defined for positioning the finger into and out of engagement with the workpiece, and means to receive and arithmetically process the springback signal for generating, when necessary, a corrected numerical control signal correlated to the sensed springback and coupled to the numerical control means for reforming the workpiece.

12. In a numerically controlled tube bender including a source of numerical control signals, numerical control means connected to be responsive to the signals from said source for positioning and bending a tube at a preselected angle of bend, said latter means releasing the tube at the bent portion in response to the source of signals to allow the tube to spring back, detection means connected to be responsive to the source of signals for determining the degree of springback of the tube and controlled by said signal source to be operative after the tube has been released to generate a numerical signal representative of the degree of springback, arithmetic control means connected to be operative from said source of signals and for receiving the springback signal to generate a corrected angle of bend numerical control signal for causing the tube to be rebent at the compensated angle of bend.

13. In a numerically controlled tube bender as defined in claim 12 wherein the arithmetic control means generates a new angle of bend in accordance with a formula defined to compensate for springback resulting from the rebending operation as well as the first bending operation.

14. In a numerically controlled tube bender as defined in claim 13 wherein the springback compensation formula is of the type $$\frac{F^2}{B}+F+B$$

wherein F is representative of the springback angle and B is representative of the desired angle of bend, the first order of correction being represented by F and the second order of correction being represented by $F^2/B$.

15. A method of automatically bending a workpiece to a preselected angle including the steps of automatically bending the workpiece to obtain the preselected angle of bend, automatically detecting the springback angle of the bent workpiece, and automatically commanding the rebending of the workpiece, only once, at an angle correlated to the springback angle of the workpiece to correct for the detected springback of the workpiece to thereby obtain the preselected angle of bend in the workpiece.

16. A method for automatically bending workpieces of substantially the same physical characteristics including the steps of automatically positioning the workpiece at a predetermined location for effecting a bend of a desired angle at a preselected location on the workpiece, automatically bending the workpiece at said preselected location at a prescribed bend angle, automatically detecting the springback angle of the bent portion of the workpiece, when springback occurs automatically correcting the prescribed bend angle to compensate for the springback of the workpiece, and commanding the rebending of the workpiece at the corrected bend angle to compensate for the springback.

17. A method for automatically bending workpieces as defined in claim 16 including recording the control data for automatically bending the workpiece including the recording of the corrected bend angle to allow subsequent bending operations on similar workpieces without the necessity of detecting the angle of springback of subsequent workpieces, and employing the recorded control data to automatically bend similar workpieces.

18. A method for automatically bending workpieces as defined in claim 17 wherein the step of recording the control data includes the steps of generating an individual record member recording the control data to be employed for bending similar workpieces.

19. In a tube bender as defined in claim 7 wherein the control member is a record member having control data recorded thereon in the form of perforations or the like.

20. In an automatically controlled tube bender including a source of positioning and bending control signals, automatic control means connected to be responsive to the signals from said source for positioning and bending a tube at a preselected angle of bend as commanded from the source, said latter means releasing the tube at the bent portion in response to the source of signals to allow the bent tube to springback, detection means connected to be responsive to said source of signals for detecting the degree of springback and providing an electrical signal representative thereof, and arithmetic control means connected to be responsive to the degree of springback signal for generating a new bend command compensated for the tube springback and for applying the new bend command to the automatic control means to automatically cause the tube to be rebent in response to the new angle of bend thereby providing a tube bent at the desired angle.

21. In an automatically controlled tube bender as defined in claim 20 wherein said detection means comprises a sensing finger movable into and out of engagement with the bent portion of the tube.

References Cited

UNITED STATES PATENTS

| 3,145,756 | 9/1964 | Hill | 72—7 |
| 3,156,287 | 11/1964 | Munro | 72—8 |
| 3,333,445 | 8/1967 | Mergler et al. | |

CHARLES W. LANHAM, *Primary Examiner.*

RONALD D. GREFE, *Assistant Examiner.*